L. G. BRADFORD.
Improvement in Bedstead-Fastenings.

No. 130,973.  Patented Sep. 3 1872.

WITNESSES  INVENTOR
Frank G. Parker  Lewis G. Bradford
Chas. Bateman Jr.  William Ellison Atty

UNITED STATES PATENT OFFICE.

LEWIS G. BRADFORD, OF PLYMOUTH, MASSACHUSETTS, ASSIGNOR TO THE BRADFORD JOINT COMPANY, OF SAME PLACE.

IMPROVEMENT IN BEDSTEAD-FASTENINGS.

Specification forming part of Letters Patent No. 130,973, dated September 3, 1872.

*To all whom it may concern:*

I, LEWIS G. BRADFORD, of Plymouth, in the county of Plymouth and State of Massachusetts, have invented certain new and useful Improvements in Bedstead-Joints, of which the following is a specification:

The Nature of the Invention.

The nature of my invention consists in an improvement on the joint secured to me by Letters Patent of the United States, dated December 6, 1870, and numbered 109,799, entitled bedstead-joint; and is confined to bending or forming the inner edge of the plate at right angles, and in using the lip so made in connection with a corresponding cut in the rail, and a cleat or covering-piece for the purpose of securing the said plate to the rail.

General Description.

Figure 1:
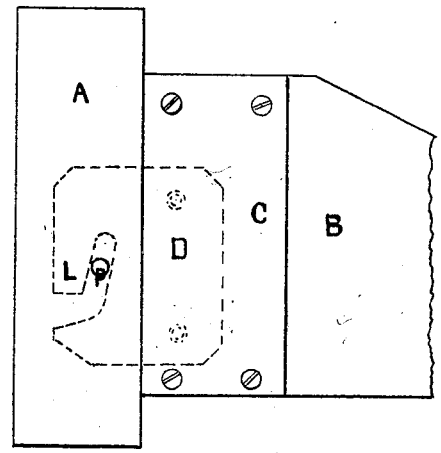
Figure 1 is an elevation of the joint, the metallic plate being indicated by dotted lines.
Figure 2:
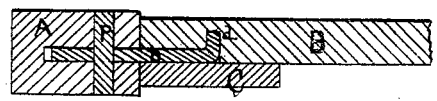
Fig. 2 is a horizontal section through the same.

Let A represent the post, and B the rail, of a bedstead made in any of the ordinary styles. D is a metallic plate, shaped as shown in Figs. 1 and 2. The part forming the hook L, and engaging with the pin P, is made as described in my Letters Patent above referred to. The end of the plate that engages with the rail is bent so as to form a lip, $d$. This lip fits into a channel in the rail, as shown in Fig. 2. The thickness of the plate is also embedded in the rail so that it may be firmly secured by the cleat C, which may be glued or otherwise fastened to the rail.

I claim as my invention—

The joint, when the same is formed by the plate D, having the inclined hook L and the lip $d$, and secured to the rail, substantially as described, and for the purpose set forth.

LEWIS G. BRADFORD.

Witnesses:
FRANK G. PARKER,
CHAS. J. BATEMAN.